United States Patent [19]

Brogårdh et al.

[11] Patent Number: 4,644,154
[45] Date of Patent: Feb. 17, 1987

[54] FIBER-OPTIC LUMINESCENCE MEASURING SYSTEM FOR MEASURING LIGHT TRANSMISSION IN AN OPTIC SENSOR

[75] Inventors: Torgny Brogårdh; Bertil Hök; Christer Ovren, all of Västerås, Sweden

[73] Assignee: ASEA Aktiebolag, Västerås, Sweden

[21] Appl. No.: 592,814

[22] Filed: Mar. 23, 1984

[30] Foreign Application Priority Data

Mar. 24, 1983 [SE] Sweden ................... 8301629

[51] Int. Cl.[4] .............................................. H01J 5/16
[52] U.S. Cl. .................................. 250/227; 250/231 R
[58] Field of Search ............... 250/227, 231 SE, 577, 250/231 R, 231 P; 374/161, 162

[56] References Cited

U.S. PATENT DOCUMENTS

| | | | |
|---|---|---|---|
| 4,270,050 | 5/1981 | Brogardh | 250/231 R |
| 4,493,995 | 1/1985 | Adolfsson et al. | 250/231 R |
| 4,523,092 | 6/1985 | Nelson | 250/227 |

FOREIGN PATENT DOCUMENTS

B7809710-2 9/1978 Sweden.

Primary Examiner—David C. Nelms
Attorney, Agent, or Firm—Watson Cole Grindle & Watson

[57] ABSTRACT

A fiber-optic measuring device for measuring physical quantities, comprising a transducer unit and an electronic unit which are interconnected by means of at least one optic fiber. The measuring transducer unit comprises at least two photoluminescent elements, of which at least one is positioned in the ray path of light from the fiber, at least partly behind another element. The physical quantities to be measured are arranged to influence the light transmission between the photoluminescent elements. The electronic unit includes at least two light sources having different emission spectra which are so chosen in relation to the absorption and transmission spectra of the photo-luminescent elements that one light source is arranged to excite substantially one of the photo-luminescent elements whereas the other light sources at least partly excite the other element or elements.

22 Claims, 15 Drawing Figures

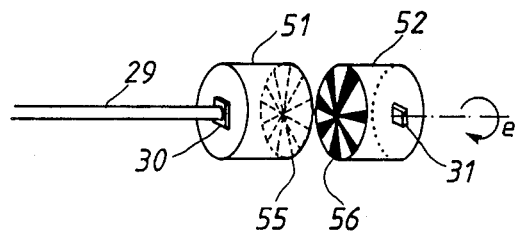
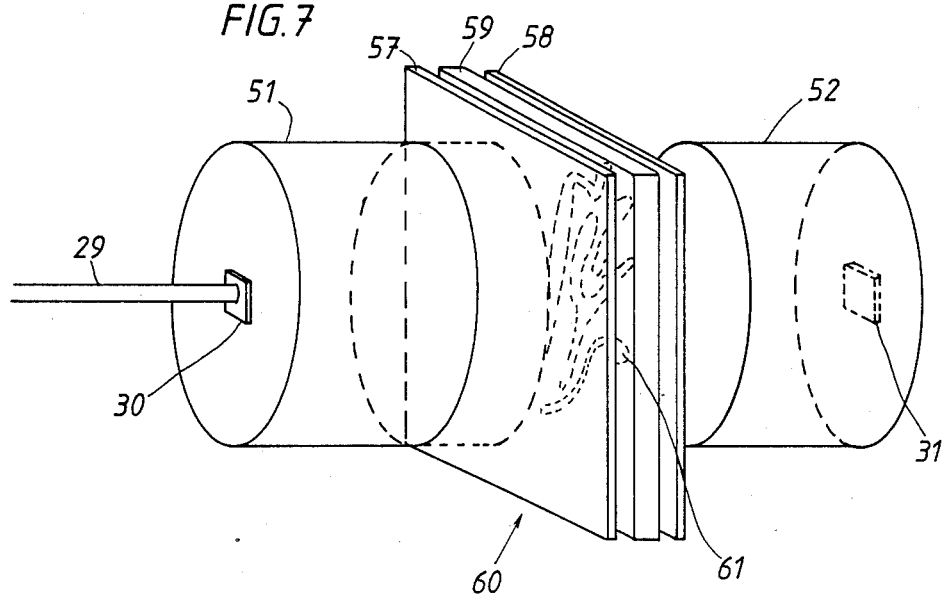

ns of sources 3 and 7 being dependent on the transmission of the sensor material 32.

FIBER-OPTIC LUMINESCENCE MEASURING SYSTEM FOR MEASURING LIGHT TRANSMISSION IN AN OPTIC SENSOR

BACKGROUND OF THE INVENTION

1. Field of the Invention

The present invention relates to a fiber-optic measuring device for measuring a physical quantity, comprising a transducer unit and an electronic unit interconnected by an optic fiber.

2. Description of the Prior Art

A large number of physical and chemical measurements may be effected using an optical transducer influenced by the quantity to be measured to modulate the light transmission. To transmit the light intensity variations caused by the transmission changes, without degradation of the accuracy of measurement, in a fiber-optic measuring system, systems with wavelength demultiplexing and spectral light division in the transducer have been developed. These measuring systems require a relatively complicated optical system in the transducer unit, while at the same time great demands are placed on the optoelectronics in the measuring electronic unit.

Many optical effects, which are well suited for measuring physical quantities, involve a change of the light transmission of a sensor material. To fiber-optically sense these transmission changes with sufficient accuracy for measuring purposes, requires the provision of means for compensating for varying attenuation and light reflection in the optical system.

OBJECT OF THE INVENTION

One object of this invention is to provide a new type of measuring system, which provides a considerably simpler and cheaper transducer and measuring electronic equipment.

SUMMARY OF THE INVENTION

A measuring device according to the invention is characterized in that the transducer unit comprises at least two photo-luminescent sensor elements, of which at least one is located in the ray path of the light from the optical fiber, completely or partially behind another element. The physical quantity to be measured is adapted to influence the light transmission between these two sensor elements. The electronic unit includes at least two light sources having separate emission spectra, these emission spectra being so chosen relative to the absorption and emission spectra of the said sensor elements that one light source substantially excites one of said photo-luminescent sensor elements, whereas other light sources also excite other elements or at least substantially excite other elements. Thus, a measuring device according to this invention constitutes a solution to the problems mentioned above and provides a possibility of employing new sensor principles.

BRIEF DESCRIPTION OF THE DRAWINGS

The invention will be exemplified in greater detail, by way of example, with reference to the accompanying drawings, wherein FIG. 6 shows a sensor for measuring angles and number of revolutions, FIG. 7 shows a sensor for measuring a magnetic field.

DESCRIPTION OF PREFERRED EMBODIMENTS

Figure 1:
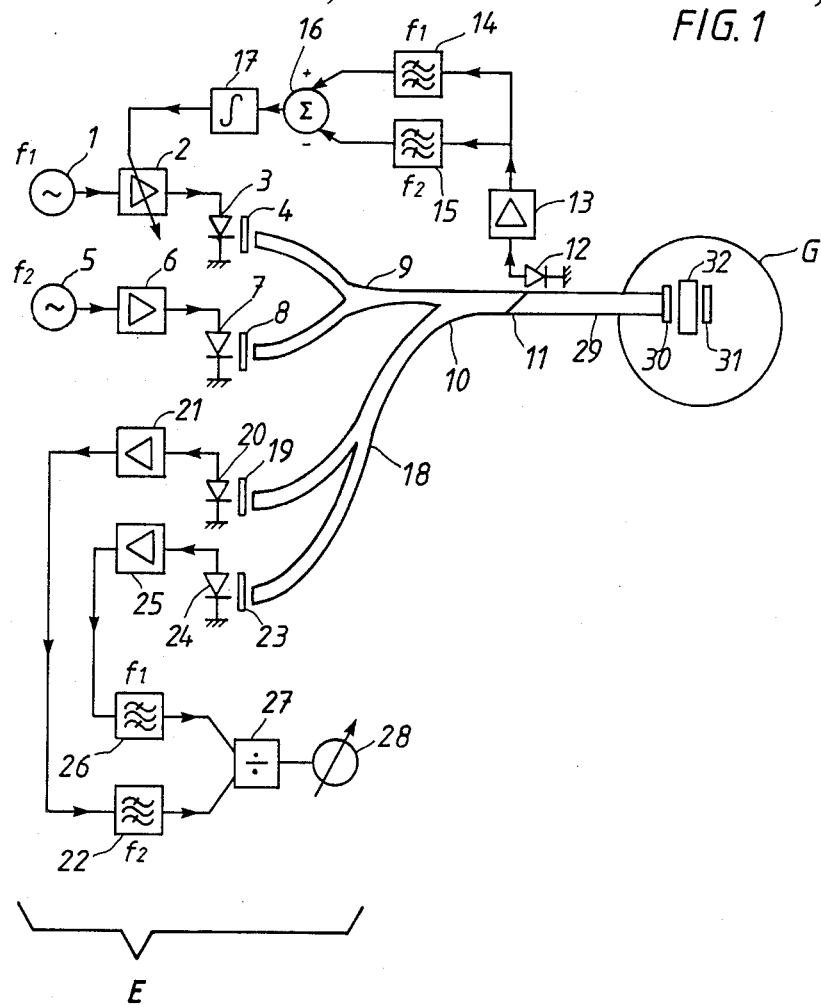
FIG. 1 shows a complete measuring system.

In the measuring system shown in FIG. 1, light sources 3 and 7 illuminate luminescent sensor elements 30 and 31 via optic filters 4 and 8, optical branches 9 and 10, a ray divider 11 and an optical fiber 29. Luminescent light generated in the sensor elements is led back through the optical fiber 29 and reaches a pair of photodetectors 20 and 24 via the ray divider 11, optical branches 10 and 18, and optical filters 19 and 23. The light sources are frequency-modulated by means of oscillators 1 and 5 feeding respective amplifiers 2 and 6 and the detector signals are frequency-demodulated by band pass filters 22 and 26. For the AC light from the light sources 3 and 7 to be maintained equal in the fiber 29, part of the light is coupled by the ray divider 11 out to a photodetector 12, the output signal of which is frequency-division demultiplexed by members 14 and 15 for control of the variable amplifier 2 with the aid of a regulator 17 and a difference generator 16. The output signal to a measuring instrument 28 is obtained by forming the quotient, at 27, of the demodulated detector signals. The emission spectra of the light sources 3 and 7 are so chosen, relative to the absorption spectra of the sensor elements 30 and 31, that the element 30 is excited by one of the light sources only and the element 31 is excited by the other light source only (or substantially by this). In this way, the formation of the quotient in 27 will give a measuring signal, which is only dependent on the optical transmission properties of a sensor material 32 interposed between the elements 30 and 31 and forming with those elements, the transducer G. Elements 30 and 31 consist of III-V, II-VI, ternary or quaternary semiconductors.

Figure 2:
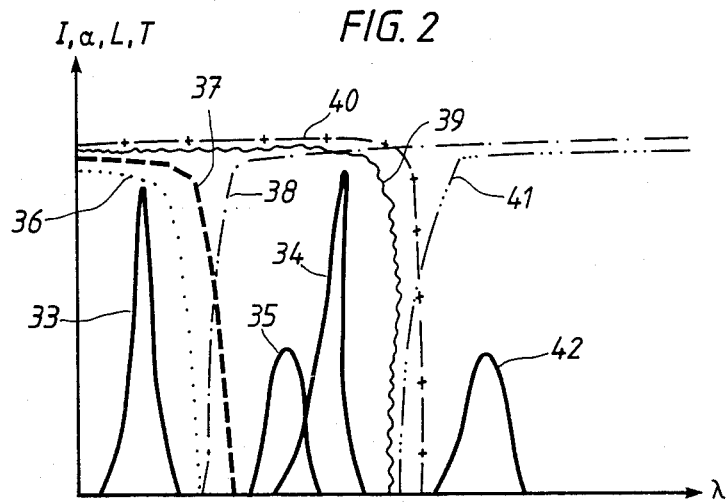
FIG. 2 shows graphically the spectral relationships, applied to the opto-components of FIG. 1, FIGS. 3, 4 and 5 show three different sensors for measuring displacement.

The operation of the measuring system shown in FIG. 1 will become clear by noting the spectral relationships shown in FIG. 2. In FIG. 2, 33 and 34 designate the emission spectra of the light sources 3 and 7; 36 and 39 designate the transmission spectra for the filters 4 and 8; 37 and 40 designate the absorption spectra for the sensor elements 30 and 31; 35 and 42 designate the luminescent spectra for the sensor elements 30 and 31, and 38 and 41 designate the transmission spectra for the filters 19 and 23. When the optical transmission of the sensor material 32 is reduced, both the excitation light to, and the luminescent light from, the element 31 will be attenuated to a greater extent, resulting in the quotient formed at 27 between the luminescent light intensities from 30 and 31 being reduced. The quotient formation guarantees that measurements of the physical quantity affecting the optical transmission of the material 32 will be independent of changes in the attenuation arising in the optical fiber 29 and the wavelength concentration in the transducer G in combination with the optical filters 19 and 23, ensures that measurements are independent of reflections which might arise in the fiber-optical system.

The light transmission between the sensor elements 30 and 31 can be modulated by the different physical quantities which it may be desired to measure in a large number of different ways, some of which are exemplified in FIGS. 3-10.

Figure 3:
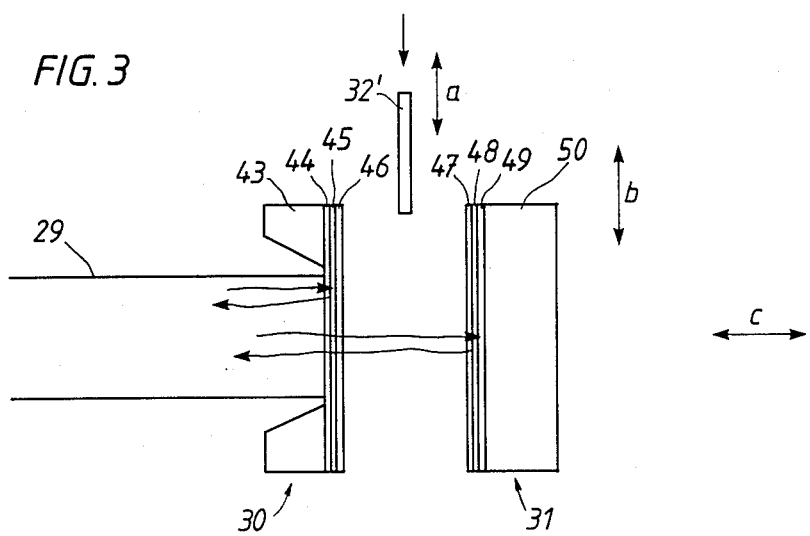

With the transducer arrangement as shown in FIG. 3, the light-transmission between the sensor elements 30 and 31 is influenced by a screen 32' which is capable of being moved between the elements 30 and 31, by the quantity to be measured, in the directions of the arrows a, or by causing the sensor element 31 to move in the directions of the arrows b and/or c relative to the optical fiber 29. The luminescent elements 30 and 31 shown in FIG. 3 are built up of epitaxial semiconductor layers 44, 45, 46 and 49, 48, 47, grown on substrates of the elements 30 and 31, respectively. The layers 45 and 48 constitute the luminescent layers, and in the element 30 the substrate has been etched away so that it will not block the excitation light.

Figure 4:
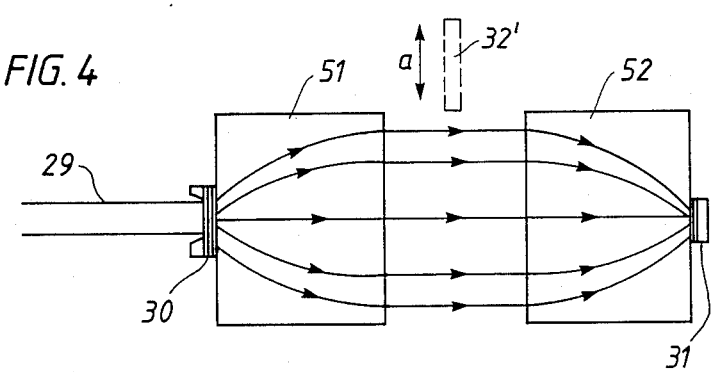

To obtain a more controlled and possibly parallel ray path between the elements 30 and 31, a lens system can be employed in the manner shown in FIG. 4. So-called "Selfoc" lenses 51 and 52 can advantageously be used and these act to diverge and then converge the light in its passage between the elements 30 and 31. As in the FIG. 3 arrangement parameter measurement can be effected via movements of a screen 32'.

Figure 5:
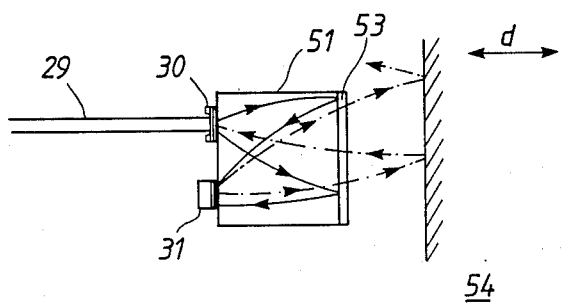

FIG. 5 shows an alternative lens system in which the excitation light from the optical fiber 29 is reflected by a dichroic mirror 53 towards the element 31. The mirror 53, which may be an interference filter, allows the luminescent light to pass through it onto a second mirror 54, where the luminescent light is reflected back into the fiber 29. Thus, with this system a horizontal displacement of the mirror 54 in the directions of the arrows d will be able to modulate the light at the luminescence wavelength leaving the element 31. Mirror 53 is, of course, not necessary, but if it is not provided both the excitation light and the luminescent light from the element 31 will be modulated by movements of the mirror 54.

If, in the system shown in FIG. 4, the lenses 51 and 52 are provided with screen patterns 55 and 56 as shown in FIG. 6, an angle-sensing transducer and/or a speed-measuring transducer is obtained. Between the lenses 51 and 52 a parallel ray bundle exists and this makes it possible to employ a high screen pattern density despite a relatively large distance between the lenses 51 and 52. The extent to which one lens 51, 52 turns (e.g. in the direction of the arrow e) relative to the other will affect the amplitude of luminescent light entering the fiber 29.

The sensor configuration shown in FIG. 4 may also be used in the system shown in FIG. 7, for measuring a magnetic field. In this case a polarizer 57, a body 59 of magneto-optical material and an analyzer 58 are located between the lenses 51 and 52 to form a transducer 60. The magneto-optical material of the body 59 is preferably of domain type, and this has been indicated by representing some domains at 61 in FIG. 7. Changes in the magnetic field applied to the body 59 will influence the amplitude of luminescent light passing back down the optical fiber 29.

Figure 8:
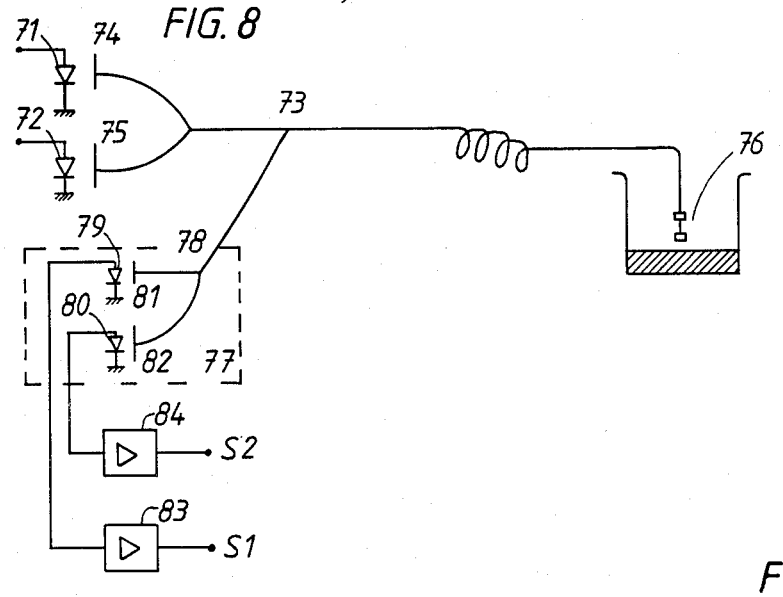
FIG. 8 shows a sensor for measuring levels.
Figure 9:
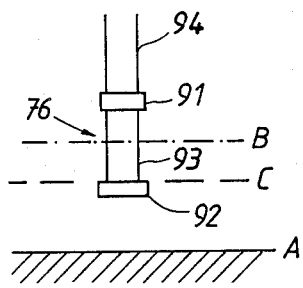
FIG. 9 shows an enlarged portion of the sensor element of FIG. 8.
Figure 10:
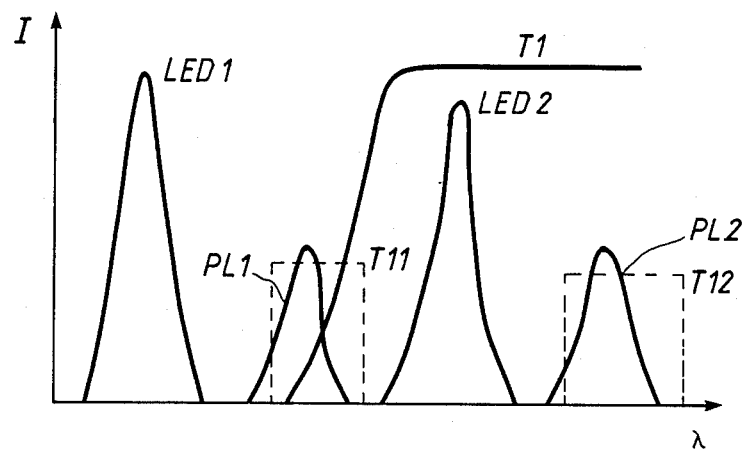
FIG. 10 shows graphically the spectral relationships existing in the system of FIG. 8.

FIG. 8 shows one example of a level (e.g. a liquid level) measuring system. Light-emitting diodes (LEDs) 71 and 72 feed incident light into a fiber system 73. By the action of optical filters 74 and 75, undesired wavelengths are filtered away from the spectra of the LEDs. In a sensor 76 the incident light is converted into light of a different wavelength by means of photoluminescence. FIG. 9 shows the sensor 76 in greater detail. The incident light is fed through a fiber 94 to a sensor portion 91, which has low absorption to incident light of the wavelength emitted by the LED 72, but high absorption to incident light of the wavelength emitted by the LED 71. An intermediate wavelength structure 93 connects the sensor portion 91 and a sensor portion 92. The sensor portion 92 has high absorption to the incident light emitted by the LED 72. The emission spectra for both the LEDs 71 and 72 and for both the luminescent sensor portions 91 and 92 are shown in FIG. 10, which also shows (at T1) the transmission curve for the sensor portion 91. The light emitted from the two sensor portions 91 and 92 is led through the fiber 94 back into the measuring electronic system and is detected in a detector portion 77 (see FIG. 8). The detector portion 77 comprises a fiber branch 78, two photodiodes 79 and 80, shown used with optical filters 81 and 82 but these filters are not essential. Transmission curves T11 and T12 for these filters are schematically shown by dash lines in FIG. 10. The LEDs 71 and 72 are amplitude-modulated at frequencies f1 and f2, respectively. In FIG. 10, $\lambda$ designates wavelength and I intensity. Amplifiers 83 and 84 (see FIG. 8) are phase-locked to these frequencies. Thus, an electrical signal S1 is generated by amplifier 83, which is dependent on the luminescence intensity from the sensor portion 91, and a signal S2 is generated by amplifier 84, which, in a corresponding manner, represents the luminescence intensity from the sensor portion 92. When a liquid level in the vicinity of the sensor 91, 92, 93 is at a position A shown in FIG. 9, the quotient S1/S2 assumes a certain given value. This value is determined by the properties of the components included in the system but is maintained constant even in the face of varying attenuation in the system because it is a quotient of the signals S1 and S2 which is monitored. The value of the quotient can also be made to be independent of the temperature by a suitable matching of the material properties of the sensor portions 91 and 92. When the liquid level assumes a position B shown in FIG. 9, the wave conductor properties of the sensor 93 are changed by the fact that the refractive index for the media above and below the liquid surface are not the same. Thus, the value of the quotient S1/S2 is changed. This quotient, therefore, provides a measure of whether or not the liquid level exceeds the level C shown in FIG. 9.

Figure 11:
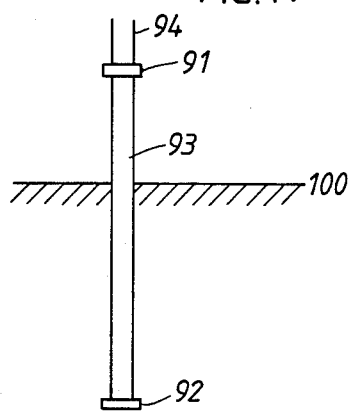
FIG. 11 shows an alternative measuring system with only one detector channel.
Figure 12:
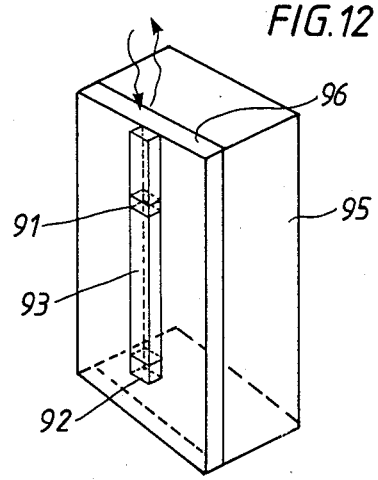
FIG. 12 shows how the sensor of FIG. 11 can be formed.

For systems employing optic fibers of multimode type, the above principle is best suited for level measuring transducers of the on/off type. If fibers or wave conductor structures of monomode type are used instead however, the coupling of light out of the sensor portion 93 can be accurately controlled. The measuring system is then able to deliver a signal which continuously indicates the position of the liquid level. FIG. 11 shows the sensor portion in such a level device. In this case, the sensor portion 93 is a wave conductor structure of monomode type. FIG. 12 shows the transducer portion of a monostable design. This transducer comprises a GaAs substrate 95, an epitaxial layer 96 of $Al_{X9}Ga_{1-X9}As$, an epitaxial layer 93 of $Al_{X3}Ga_{1-X3}As$, an epitaxial layer 91 of $Al_{X1}Ga_{1-X1}As$, and an additional epitaxial layer 92 of $Al_{X2}Ga_{1-X2}As$. The doping concentrations and the Al contents in the layers included are chosen so that X9 assumes the greatest value, which provides a wave conductor effect at the "inner" limiting surface of the wave conductor. X3 is chosen so that the absorption of the wavelengths transmitted in the system is small. The values of X1 to X9 are therefore selected so that $X9 > X3 > X1 > X2$. The sensor portions 91 and 92 are provided with a doping concentration such that luminescent light is generated with good efficiency in these portions. The spectra of the luminescent light thus emitted may have the forms shown at PL1 and PL2 in FIG. 10.

Figure 13:
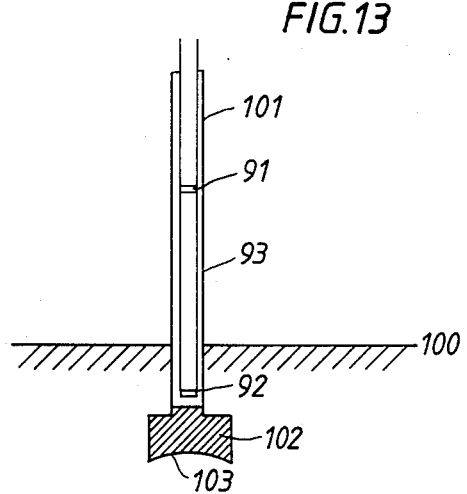
FIG. 13 shows a different embodiment of the measuring device of FIG. 11.

One problem that may arise when a measuring device according to the above-described designs is used for level measurement, for example in various liquids, is that the hydraulic and dielectric properties of these liquids may have an effect on the function of the measuring device and on its calibration. It may therefore be convenient to design the measuring device according to the principle shown in FIG. 13. In FIG. 13, it is the boundary surface 100, whose position is to be sensed. Sensor portions 91, 92 and 93, with properties as described above, are enclosed within an inner container 101, containing a liquid shown at 102. The properties of this liquid can thus be chosen freely with this embodiment, irrespective of the liquid defining the surface 100. A flexible diaphragm 103 allows the volume of the container 101 to be varied as the diaphragm 103 is deflected. The extent to which the diaphragm 103 will be deflected is determined by the pressure difference across it and this in turn is influenced by changes in the level 100. By a suitable choice of the volume of the inner container 101 and the thickness and cross-sectional area of the diaphragm 103, the transducer 91, 92, 93 can be given any suitable characteristic for a given application.

Figure 14:
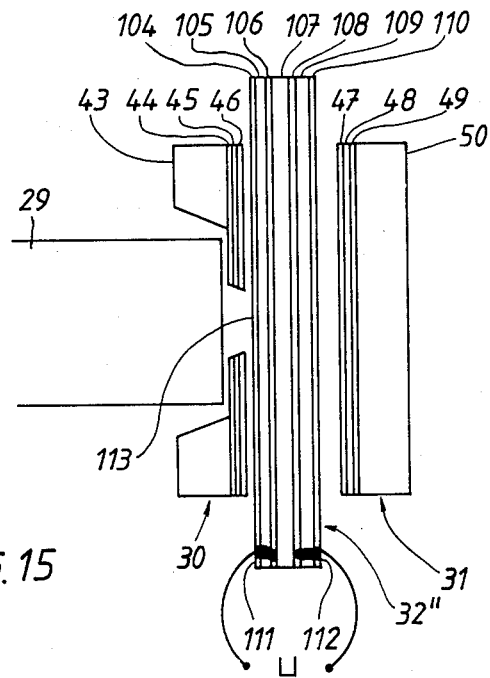
FIG. 14 shows a still modified sensor.
Figure 15:
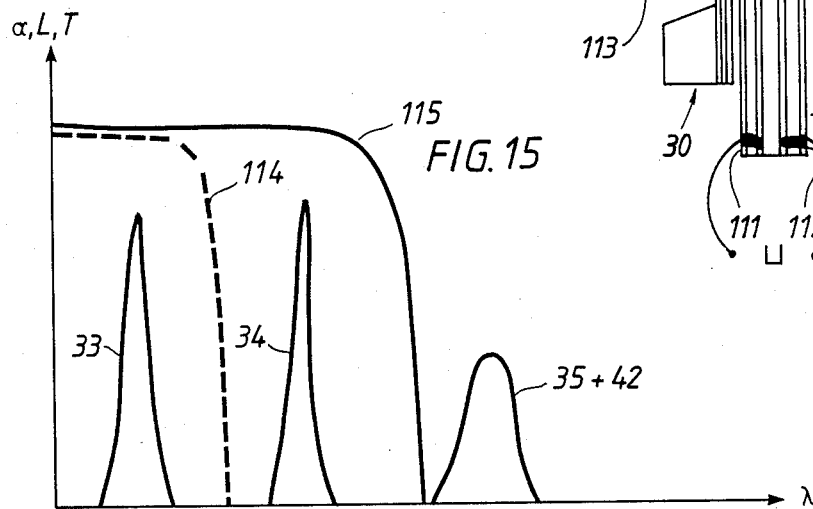
FIG. 15 shows the spectral relationships associated with the sensor of FIG. 14.

FIGS. 14 and 15 show a further embodiment of sensor for measuring electrical fields and voltages and its associated spectral relationships. In the same way as in FIG. 3, the transducer comprises two luminescent elements 30 and 31 with the epitaxial layers 44-46 and 47-49, respectively, applied on the substrates 43 and 50. However, the element 30 has a hole 113 etched through the layers 44-46, through which light is able to pass to the element 31 without being influenced by the element 30 (the element 31 is identical with the element 31 in FIG. 3). Instead of a through-hole, the layers 44 and 45 may be etched away whereas the layer 46 is retained. between the elements 30 and 31 an electro-optical modulator 32" is placed, which consists of a polarizer 104, a glass plate 105, a transparent electrode 106, a liquid crystal layer 107, a transparent electrode 108, a glass plate 109 and a polarizer 110. By means of contacts 111 and 112, a voltage U can be applied across the electrodes 105 and 103 for modulating the optical properties of the liquid crystal layer 107.

FIG. 15 shows emission spectra 33 and 34 of the two light sources (e.g. the sources 3 and 7 in FIG. 1). In FIG. 15, $\alpha$ is light absorption, L is light emission, T is light transmission, and $\lambda$ is wavelength.

The embodiments described above can be varied in many ways within the scope of the following claims.

What is claimed is:

1. A fiber-optic measuring device for measuring a physical quantity, comprising:
   a transducer unit,
   an electronic unit, and at least one optical fiber interconnecting the transducer and electronic units,
   the transducer unit comprises at least a first and a second photo-luminescent sensor element, of which at least the first element is placed in the ray path of light from the fiber, at least partially behind the second element,
   means adapted to influence the light transmission between said first and second elements and is influenced by said physical quantity,
   the electronic unit comprises at least two light sources having sseparate emission spectra, said emission spectra being so chosen relative to absorption and transmission spectra of said first and second elements that said one light source substantially excites one of said photoluminescent elements whereas said other light source at least substantially excites said other photo-luminescent element.

2. A measuring device according to claim 1, in which said first and second sensor elements are formed from III-V and II-VI, ternary and quaternary semiconductor materials and in which said first and second elements are arranged to have different optical properties.

3. A measuring device according to claim 2, in which said first and second elements in the ray path have different band gaps and that these are chosen so that the first element which is positioned nearest the end of the optical fiber has a greater band gap than the second element.

4. A measuring device according to claim 3, in which the first and second elements are both made from semiconductor materials having the formula $Ga_xAl_{1-x}As$, the Al content being higher in the first element than in the second.

5. A measuring device according to claim 1, in which excitation light from said light sources is arranged to be sensed by a photo-detector connected to a regulator for controlling the light sources such that the relation between the light intensities of these light sources can be controlled, the signals from the detector emanating from the photo-luminescence in the transducer unit at different excitation light being supplied to at least one of a calculating member and a regulator for controlling output from said detector.

6. A measuring device according to claim 5, in which the light sources are frequency multiplexed and are provided with optical filters of the interference type for blocking the light in the wavelength range in which photo-luminescence occurs, the detector is provided with optical filters for blocking light in the wavelength range in which the excitation light occurs.

7. A measuring device according to claim 2, in which said first and second sensor elements consist of epitaxial layers grown on substrates, at least one of the epitaxial layers being surrounded by epitaxial layers with larger band gaps.

8. A measuring device according to claim 2, in which part of the first element is not located in the ray path from the optical fiber but allows light to pass to the second element without first passing through the first element.

9. A measuring device according to claim 1, in which a lens system is between said first and second elements to obtain, in at least a part of the light ray path between the elements, greater parallelism of the light than prevails when the light passes out of the optical fiber.

10. A measuring device according to claim 9, in which said physical quantity to be measured is adapted to influence the light transmission in that part of the ray path where greater parallelism of the light exists.

11. A measuring device according to claim 9, in which an interference filter is placed in that part of the ray path where greater parallelism of the light exists.

12. A measuring device according to claim 9, in which said lens system consists of at least one SELFOC lenses.

13. A measuring device according to claim 1, in which the light transmission between said first and second elements is adapted to be influenced by the physical quantity to be measured by said physical quantity modulating at least one of the position of a screen between the said elements, (b) one of the distance, the angle, the relative position perpendicular to the ray path and the relative angle of rotation between the said elements and (c) the distance between the elements and a mirror.

14. A measuring device according to claim 1, in which the light transmission between said first and second elements is adapted to be modulated by at least one of a magneto-optical modulator and an electro-optical light modulator.

15. A measuring device according to claim 14, in which said modulator is polarizationrotating and is provided with light polarizers placed in the ray path on either side of the modulator.

16. A measuring device according to claim 15, in which said modulators consist of at least one of a magnetic thin film with magnetic domains and a liquid crystal.

17. A measuring device according to claim 1, in which between said first and second photoluminescent elements there is a light-conducting member, the transmission of which is adapted to be modulated by the said physical quantity to be measured.

18. A measuring device according to claim 17, in which said modulation is adapted to be obtained by a medium with a substantially well-defined refractive index in contact with said light conducting member for coupling out light from said light conducting member.

19. A measuring device according to claim 18, in which said light conducting member constitutes a level detector, whereby a medium, the level of which is to be measured, is at least one directly coupling out light from said light conducting member and influences an enclosed second medium for the purpose of coupling out light from the light conducting member.

20. A measuring device according to claim 18, in which the light conducting member consists of a wave guide integrated on the same body as said photoluminescent elements.

21. A measuring device according to claim 2, wherein at least one of said first and second elements includes a light-attenuating filter.

22. A measuring device according to claim 2, wherein elements in at least part of the light ray path include semiconductor materials having different band gaps.

* * * * *